(12) United States Patent
Dale et al.

(10) Patent No.: US 8,885,204 B1
(45) Date of Patent: Nov. 11, 2014

(54) METHOD OF PRODUCING AN ORDERED STACK OF BOUND PRODUCT INFORMATION SHEETS FOR A STORE FROM PLANOGRAM OR ORDERED DATA

(71) Applicant: Information Planning & Management Service, Inc., Sterling, VA (US)

(72) Inventors: Ernest James Dale, Waterford, VA (US); James Fernando Jiron, Smithsburg, MD (US); John Patrick Desmet, Sterling, VA (US); Nathan Andrew Rowell, Germantown, MD (US)

(73) Assignee: Information Planning & Management Service, Inc., Sterling, VA (US)

( * ) Notice: Subject to any disclaimer, the term of this patent is extended or adjusted under 35 U.S.C. 154(b) by 0 days.

(21) Appl. No.: 14/451,327

(22) Filed: Aug. 4, 2014

Related U.S. Application Data

(62) Division of application No. 14/159,921, filed on Jan. 21, 2014, now Pat. No. 8,836,990.

(51) Int. Cl.
*G06K 15/00* (2006.01)
*G06F 3/12* (2006.01)
*G06Q 10/00* (2012.01)
*G06Q 30/00* (2012.01)
*A01K 5/02* (2006.01)
*G06K 15/02* (2006.01)
*G06Q 10/08* (2012.01)

(52) U.S. Cl.
CPC ............ *G06K 15/404* (2013.01); *G06K 15/024* (2013.01); *G06F 3/1208* (2013.01); *G06F 3/1243* (2013.01); *G06Q 10/087* (2013.01)

USPC ......... 358/1.16; 358/1.15; 358/1.1; 705/7.12; 705/26.1; 705/28; 705/29

(58) Field of Classification Search
None
See application file for complete search history.

(56) References Cited

U.S. PATENT DOCUMENTS

| | | | |
|---|---|---|---|
| 3,767,039 A | 10/1973 | Schroter | 206/59 C |
| 4,188,250 A | 2/1980 | Grass | 156/253 |
| 6,921,453 B2 | 7/2005 | Dronzek, Jr. et al. | 156/270 |
| 7,287,001 B1 * | 10/2007 | Falls et al. | 705/22 |
| 8,273,436 B2 | 9/2012 | Flynn | 428/42.2 |
| 8,626,613 B2 * | 1/2014 | Dale et al. | 705/28 |
| 2011/0066458 A1 * | 3/2011 | Dale et al. | 705/7 |
| 2013/0144757 A1 * | 6/2013 | Bauer et al. | 705/26.61 |
| 2013/0173435 A1 * | 7/2013 | Cozad, Jr. | 705/28 |

* cited by examiner

*Primary Examiner* — Marcus T Riley
(74) *Attorney, Agent, or Firm* — Pillsbury Winthrop Shaw Pittman LLP

(57) ABSTRACT

An ordered stack of bound sheets may comprise a set of printed product information sheets. An individual bound sheet may comprise a single printed product information sheet or may comprise a plurality of printed product information sheets. Each of the individual printed product information sheets may be detached from the ordered stack of bound sheets in the order in which the printed product information sheets are presented. The individual printed product information sheets (which are detached from the ordered stack in order) may be connected to structures in the stores based on a planogram for a set of products for display in the store. The order of the printed product information sheets may match an order in which the sheets are positioned based on the planogram.

10 Claims, 9 Drawing Sheets

METHOD OF PRODUCING AN ORDERED STACK OF BOUND PRODUCT INFORMATION SHEETS FOR A STORE FROM PLANOGRAM OR ORDERED DATA

CROSS-REFERENCE TO RELATED APPLICATIONS

This application is a divisional of U.S. patent application Ser. No. 14/159,921, filed Jan. 21, 2014, now U.S Pat. No. 8,836,990, the entire contents of which is incorporated herein by reference.

FIELD OF THE INVENTION

The invention relates to an ordered stack of bound sheets comprising a set of printed product information sheets for a store, where the printed product information sheets are removably attached to each other and ordered according to planogram data or ordered data for the store, and to a method of producing the ordered stack of bound sheets comprising the set of printed product information sheets for the store.

BACKGROUND OF THE INVENTION

Generally speaking, stores use product strips, labels, indicia, etc. ("labels") to provide information related to products available in the store, and to attract attention to those products. A product label may provide information related to price, sale price, UPC code, product description, weight, and/or other product information for a product on display for sale at a store.

Conventional product labels may exist, but have various limitations and drawbacks. For example, conventional systems may produce a set of product labels for a store employee to place in the store. Store employees may have to consult planogram data and/or other plans to determine where to place the product labels in the store. Even if the product labels are provided to the store employee in a predetermined order, the product labels themselves may be disposed on separate sheets that may be delivered to a store with a fastener, such as a tie, rubber band, plastic band, and/or other fastener holding the labels together. These fasteners may fail to maintain the order of the labels during shipment, placement, and/or other handling of the labels. For example, a fastener holding the labels together may break during shipment of the labels, during placement of a label, and/or at another time. In another example, after an employee removes the fastener in order to begin placing the labels, the order of the labels may be unintentionally altered. These and other drawbacks exist.

SUMMARY OF THE INVENTION

According to an embodiment, an ordered stack of bound sheets may be provided. The ordered stack of bound sheets may comprise a set of printed product information sheets. An individual bound sheet may comprise a single printed product information sheet or may comprise a plurality of printed product information sheets. A person, machine, apparatus, and/or other entity used by the store may detach each of the individual printed product information sheets from the ordered stack of bound sheets in the order in which the printed product information sheets are presented to the worker. The person, machine, apparatus, and/or other entity in the store may connect the individual printed product information sheets (which are detached from the ordered stack in order) to structures in the stores based on a planogram for a set of products for display in the store. The order of the printed product information sheets may match an order in which the person, machine, apparatus, and/or other entity moves through the store based on the planogram.

In the ordered stack of bound sheets, each individual sheet may be bound to the ordered stack of sheets. For example, an individual sheet may be bound to an adjacent sheet, to the ordered stack of sheets as a whole, and/or be otherwise bound to the ordered stack of bound sheets. An individual sheet of the ordered stack of bound sheets may comprise, for example, a printed production information sheet, a set of printed production information sheets where a first printed product information sheet shares an edge with a second printed product information sheet, a substrate on which a set of printed product information sheets may be disposed, and/or other carrier onto which one or more printed product information sheets may be disposed.

In some embodiments, the ordered stack of bound sheets may be bound at a corresponding edge of each of the individual sheets. In some examples, the ordered stack of bound sheets may be bound by a glue binding at a corresponding edge (e.g., a top edge, side edge, bottom edge, and/or other edge) of each of the individual sheets. In some examples, the ordered stack of bound sheets may be bound by a spiral binding, staple binding, and/or other mechanical binding. In some embodiments, each individual bound sheet may comprise a header adjacent the top edge, with a second tearable edge between the header of the bound sheet and the remainder of the bound sheet. An individual bound sheet may be removed from the stack of bound sheets via the tearable edge. In some embodiments, each individual bound sheet may be removed from the stack of bound sheets by removing the entire individual bound sheet out of the mechanical binding. In other embodiments, the ordered stack of bound sheets may be bound by removably attaching a first bound sheet to an adjacent second bound sheet of the ordered stack of bound sheets, where the second bound sheet has been removably attached to an adjacent third bound sheet of the ordered stack of bound sheets. The manners in which the sheets may be bound in the ordered stack are not limited to the embodiments described herein.

The ordered stack of bound sheets may be ordered based on the information printed on the printed product information sheets of the stack. An individual printed product information sheet may be associated with an individual product displayed in the store or a set of products that are displayed adjacent to each other in the store. An individual printed product information sheet may be placed at a shelf, peg board, and/or other structure near the location of the product(s) associated with the individual printed product information sheet. An individual printed product information sheet may have printed thereon information related to the associated product(s), order or position indicator information, and/or other information related to a product in the store.

The ordered stack of bound sheets may be ordered based on the order indicator information printed on the individual printed product information sheets. Order indicator information of an individual printed product information sheet may include, for example, information related to an order of the printed product information sheet relative to the other printed product information sheets in the ordered stack of bound sheets.

In some embodiments, the information related to the order of the printed product information sheet may comprise a number relating to the position of the printed product information sheet in the set of printed information sheets included in the ordered stack of bound sheets, planogram information for the product(s) associated with the printed product information sheet from a planogram of products available in the store, a combination thereof, and/or other information related to the order of the printed product information sheet relative to the other printed product information sheets in the ordered stack of bound sheets.

The planogram information may comprise information related to the location of the associated product(s) in the store, a location at which the printed product information sheet is to be placed in the store, a combination thereof, and/or other information related to the location of the printed product information sheet. In some embodiments, the ordered stack of bound sheets may be ordered based on the planogram information of the printed product information sheets (e.g., based on locations at which the printed information sheets of the ordered stack are to be placed).

In some embodiments, the planogram information may comprise textual information related to a specific placement of the product (e.g., with regard to aisle, shelf, location on shelf, and/or other location of an associated product), a graphic depiction of a location in the store (e.g., absolute location, location relative to a next ordered printed product information sheet, and/or other location) based on the planogram information for the printed product information sheet, a combination thereof, and/or other information related to the location of the printed product information sheet in the store. In some embodiments, the planogram information may also comprise information related to placement location of an adjacent previous printed product information sheet and an adjacent next printed product information sheet in the ordered stack of bound sheets.

The information related to the product that is printed on the printed product information sheet may comprise product description and/or graphical representation of the product, product price label information, retailer-specific information, a combination thereof, and/or other information related to the product. Product price label information may comprise, for example, mandatory information to be displayed for a product, such as product identifier, UPC code, price, weight per unit, and/or other information required to be provided with a product displayed in a store. Retailer-specific information may comprise, for example, information relating to a sale, coupon, and/or other promotion of a product, cross-sell information about a related product, and/or other retailer-specific information about the product.

In some embodiments, the individual printed product information sheet may be placed at a shelf, peg board, and/or other structure near the location of the product associated with the individual printed product information sheet. In some embodiments, the structure itself may comprise a connector in which the individual printed product information sheet may be disposed. For example, the individual printed product information sheet may be die cut to fit into a holder at the structure. In some embodiments, the individual printed product information sheet may comprise a connector via which the individual printed product information sheet may be attached to the structure. The connector of the individual printed product information sheet may comprise, for example, an adhesive connector, a clip, and/or other fastener.

In some embodiments, a first printed product information sheet and a second printed product information sheet in a single ordered stack of bound sheets may have different templates, may be of different sizes, may comprise different types of printed information, may comprise information printed in different orientations, colors, and/or with other different formats, may comprise different connectors for connection to a respective structure in the store, and/or may otherwise have different characteristics. In some embodiments, a first bound sheet and a second bound sheet may have different sizes, may comprise a different number of printed product information sheets disposed thereon, and/or may have other different characteristics.

In some embodiments, a computer-implemented method for producing an ordered stack of bound sheets comprising a set of printed product information sheets may be implemented in a computer system comprising one or more physical processors and one or more printers communicably coupled to the one or more physical processors. The method for producing an ordered stack of bound sheets that include a set of printed product information sheets may comprise, for example, receiving, by the one or more physical processors, planogram data for a store, wherein the planogram data identifies a set of products for display in the store, and, for each individual product of the set of products, information related to a respective location in the store at which the individual product is displayed. Information related to a location at which a product is displayed may comprise, for example, an aisle number, a shelf and/or other structure number, a location on the shelf and/or other structure, an identification of an adjacent product, any combination thereof, and/or other location information related to the product.

Based on the planogram data and the structure at which a product is displayed, a set of printed product information sheets may be printed by the one or more physical processors and the one or more printers, such that the set of printed product information sheets may comprise information about the set of products for display in the store. An individual printed product information sheet may have printed thereon information about an individual product or a set of products, information about a location at which the printed product information sheet is to be placed in the store, an order indicator indicating an order of the printed product information sheet relative to the other printed product information sheets in the set of printed product information sheets, and/or other information related to the product or set of products associated with the individual printed product information sheet.

In some embodiments, the information to be printed on an individual printed product information sheet may be accessed, by the one or more physical processors, from one or more databases communicably coupled to the one or more physical processors. The databases may include, for example, a planogram database comprising planogram data for the store, a product database comprising product information for the set of products for display in the store, a non-transitory electronic storage device configured to store a set of indicators for each individual product that indicate what information is to be printed for an individual product, and/or other information related to the set of products, and/or other databases related to the store.

The printed product information sheet may be placed adjacent to the product in the corresponding structure at which the product is displayed. In some embodiments, the planogram database, product database, and/or other databases may comprise information related to how the printed product information sheet is to be attached to a structure at which the associated product(s) are displayed. Based on the attachment, the printed product information may be die cut to fit into a connector disposed at the structure, may have a connector affixed thereon, and/or may otherwise be made ready to connect to the structure at which the printed product information sheet is to be placed. In some embodiments, this operation may be performed before or after the ordered stack of bound sheets comprising the set of printed product information sheets are bound.

In some embodiments in which a bound sheet of the ordered stack of bound sheets comprises an individual printed product information sheet, the printed product information sheets may be bound together in an order based on the order indicator information printed on the set of printed product information sheets.

In other embodiments in which a bound sheet of the ordered stack of bound sheets comprises a plurality of printed product information sheets, the bound sheets may be bound together in an order based on the order indicator information printed on the plurality of printed product information sheets.

In other embodiments in which a bound sheet comprises a substrate onto which one or more printed product information sheets may be disposed, the set of printed product information sheets may be apportioned in order to one or more substrates, based on a number of printed product information sheets that may be disposed on an individual substrate. The substrates may be bound before or after the printed product information sheets are disposed thereon.

These and other aspects, features, and characteristics of the present invention, as well as the functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
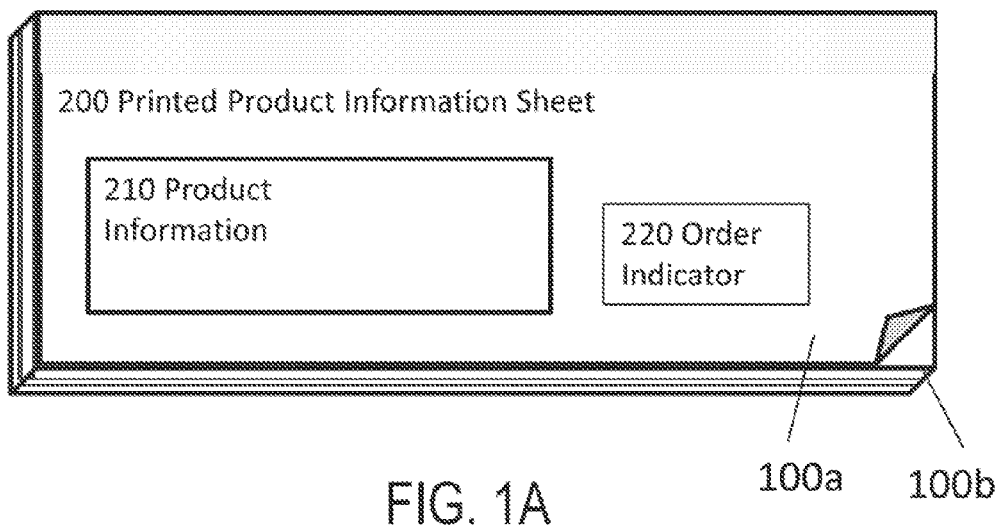
FIG. 1A illustrates an exemplary ordered stack of bound sheets comprising a set of printed product information sheets, according to an aspect of the invention.

FIGS. 1A-1E illustrate exemplary ordered stacks of bound sheets 10a, 10b, 10c, 10d, 10e respectively, where each ordered stack 10 of bound sheets 100 comprises a set of printed product information sheets 200, according to an aspect of the invention. According to an aspect of the invention, an ordered stack 10 of bound sheets 100 may be provided. The ordered stack 10 of bound sheets 100 may comprise a set of printed product information sheets 200. An individual bound sheet 100a may comprise a single printed product information sheet 200a or may comprise a plurality of printed product information sheets 200a, 200b, . . . , 200n. Each of the individual printed product information sheets 200 may be detached from the ordered stack of bound sheets 10 in the order in which the printed product information sheets 200 are presented to the worker. The individual printed product information sheets 200 (which are detached from the ordered stack 100 in order) may be connected to structures in the stores based on a planogram for a set of products for display in the store. The order of the printed product information sheets 200 may match an order in which the worker moves through the store based on the planogram.

In some embodiments, a set of printed product information sheets 200 may correspond to all of the products for display in the store. In some embodiments, a set of printed product information sheets 200 may correspond to a subset of the products for display in the store. For example, a set of printed product information sheets 200 may comprise replacement sheets for printed product information sheets 200 that are disposed throughout the store. A set of printed product information sheets 200 also may correspond only to products to be placed in a certain section aisle, shelf, and/or other area of the store.

Figure 1B:
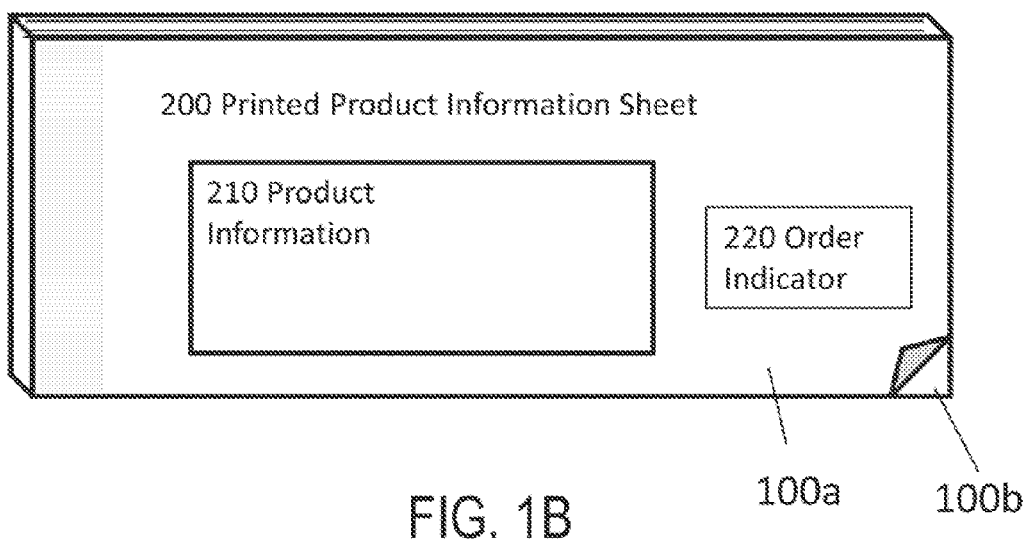
FIG. 1B illustrates an exemplary ordered stack of bound sheets comprising a set of printed product information sheets, according to an aspect of the invention.
Figure 1C:
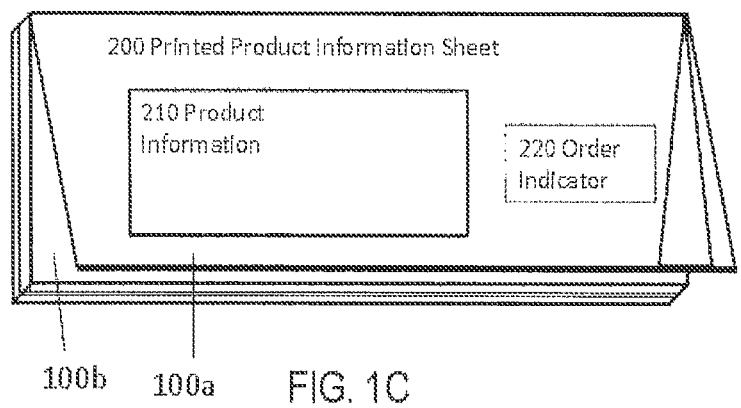
FIG. 1C illustrates an exemplary ordered stack of bound sheets comprising a set of printed product information sheets, according to an aspect of the invention.
Figure 1D:
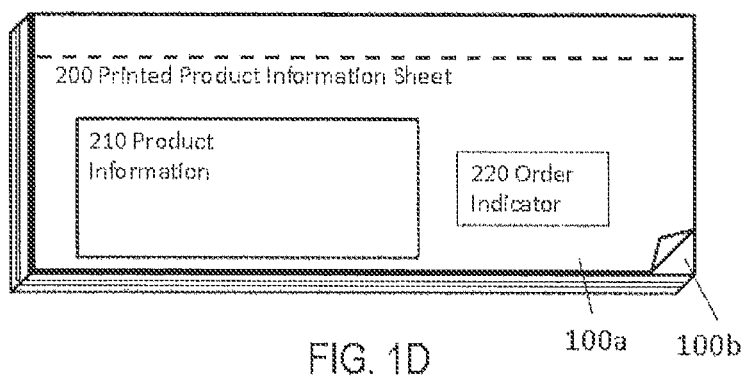
FIG. 1D an exemplary ordered stack of bound sheets comprising a set of printed product information sheets, according to an aspect of the invention.

In the ordered stack of bound sheets 10, each individual sheet 100 may be bound to the ordered stack of sheets. For example, an individual sheet 100a may be bound to an adjacent sheet 100b as shown in FIGS. 1A and 1B, to the ordered stack of sheets 10 as a whole as shown in FIGS. 1C and 1D, and/or be otherwise bound to the ordered stack of bound sheets 10. As shown in FIGS. 1A, 1B, 1C, and 1D, the ordered stack of bound sheets may be bound at a corresponding edge of each of the individual sheets.

As shown in FIG. 1A, an individual sheet may be bound to the remainder of the stack of ordered sheets. For example, sheet 100a of the ordered stack of bound sheets 100 may be removably attached to an adjacent second bound sheet 100b of the ordered stack of bound sheets 100, where the second bound sheet 100b has been removably attached to an adjacent third bound sheet of the ordered stack of bound sheets 100.

The sheet 100a may be removably attached to the second sheet 100b by an adhesive, by VELCRO, by glue, and/or by any known mechanisms for releasably securing sheets of material to one another. An individual bound sheet may be removed from the stack of bound sheets by pulling the sheet away from the remainder of the ordered stack of bound sheets (such that the force of pulling the sheet is greater than the adhesive force between the individual bound sheet and the remainder of the ordered stack of bound sheets). As shown in FIG. 1A, the binding of the individual bound sheets 10 may be by use of a given width of releasable adhesive at or near a top edge of the bound sheets.

FIG. 1B shows an ordered stack of bound sheets 10b similar in structure to the ordered stack of bound sheets 10a, but the binding of the individual bound sheets 100 may be by use of a given width of releasable adhesive at or near a side edge of the bound sheets instead of a top edge of the sheets.

As shown in FIG. 1C, the ordered stack of bound sheets may be bound by a glue binding at a corresponding top edge of each of the individual sheets. An individual bound sheet may be removed from the stack of bound sheets by tearing the sheet away from the remainder of the ordered stack of bound sheets.

As shown in FIG. 1D, each individual bound sheet may comprise a header adjacent the top edge, with a tearable edge (dotted line in FIG. 1D) between the header of the bound sheet and the remainder of the bound sheet. The bound sheets may be bound together using a strong adhesive, such as a glue, a heat-activated adhesive binding, and/or other adhesive. An individual bound sheet may be removed from the stack of bound sheets via the tearable edge.

Figure 1E:
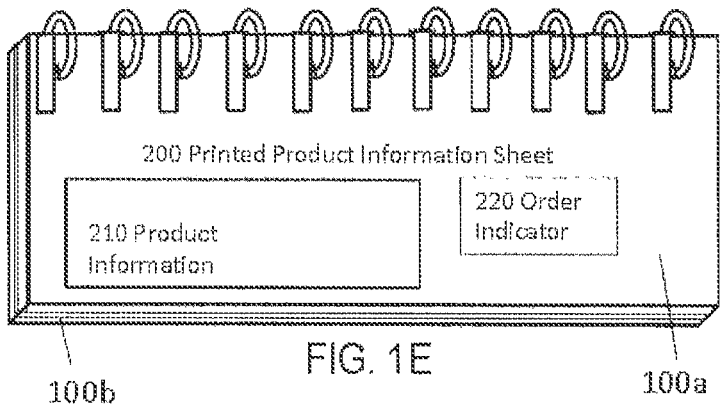
FIG. 1E an exemplary ordered stack of bound sheets comprising a set of printed product information sheets, according to an aspect of the invention.

As shown in FIG. 1E, the ordered stack of bound sheets may be bound by a spiral binding, staple binding, and/or other mechanical binding. An individual bound sheet may be removed from the stack of bound sheets by removing the entire individual bound sheet out of the mechanical binding.

An individual sheet 100a of the ordered stack of bound sheets may comprise, for example, a printed production information sheet 200a, a set of printed production information sheets 200a, 200b where a first printed product information sheet 200a shares an edge with a second printed product information sheet 200b, a substrate 100c on which a set of printed product information sheets 200a, 200b, . . . , 200n may be disposed, and/or other carrier onto which one or more printed product information sheets 200 may be disposed.

Figure 2A:
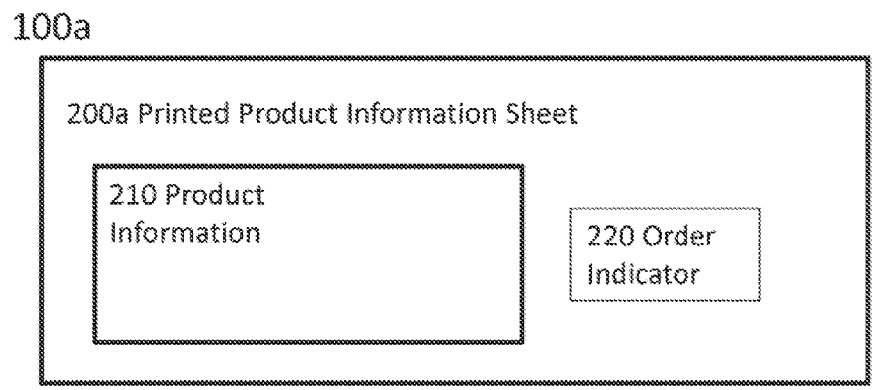
FIG. 2A illustrates an exemplary bound sheet, according to an aspect of the invention.

As shown in FIG. 2A, individual sheet 100a of the ordered stack of bound sheets may comprise, for example, a single printed production information sheet 200a. In some embodiments, the individual sheet 100 is a printed product information sheet 200a.

Figure 2B:
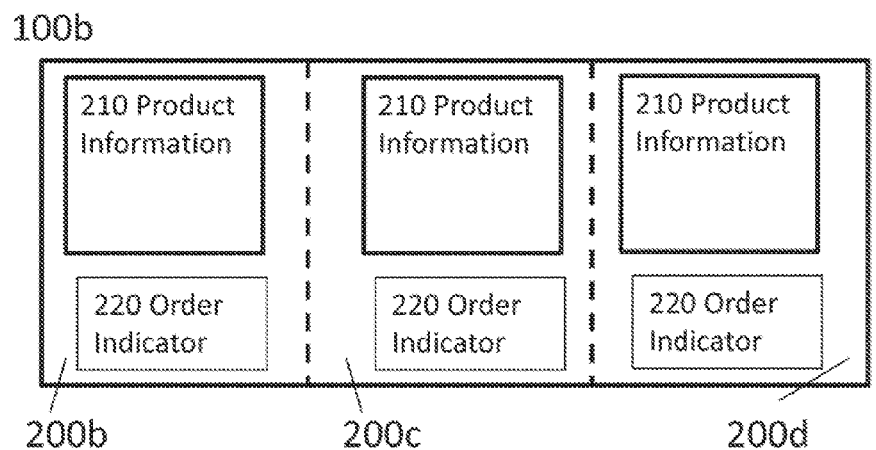
FIG. 2B illustrates an exemplary bound sheet, according to an aspect of the invention.

As shown in FIG. 2B, individual sheet 100b of the ordered stack of bound sheets may comprise, for example, a set of printed production information sheets 200a, 200b, . . . , 200n, where a first printed product information sheet 200b shares an edge with a second printed product information sheet 200c. In the example shown in FIG. 2B, first printed product information sheet 200b shares an edge (shown by the vertical dotted line in FIG. 2B) with second printed product information sheet 200c, and second printed product information sheet 200c shares an opposite edge with third printed product information sheet 200d. The edges shared by two printed product information sheets may be tearable. For example, the edges shared by two printed product information sheet may be perforated, may be set out in thick lines to indicate a cutting line, and/or may otherwise be easily separable.

In some embodiments, the sizes of the first printed product information sheet 200b, the second printed product information sheet 200c, and the third printed product information sheet 200d may be the same. In some embodiments, the size of the first printed product information sheet 200b may be different from the size of the second printed product information sheet 200c. In some embodiments, the template and layout of the first printed product information sheet 200b, the second printed product information sheet 200c, and the third printed product information sheet 200d may be the same. In some embodiments, the template, layout, types of information printed, any combination thereof, and/or other information disposed on the first printed product information sheet 200b may be different from that disposed on the second printed product information sheet 200c.

Figure 2C:
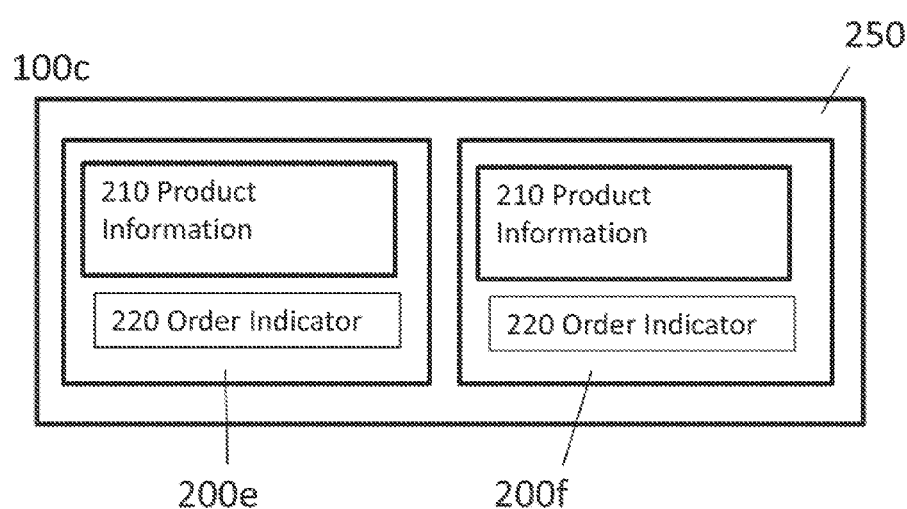
FIG. 2C illustrates an exemplary bound sheet, according to an aspect of the invention.

As shown in FIG. 2C, individual sheet 100c of the ordered stack of bound sheets may comprise, for example, a substrate 250 onto which one or more printed production information sheets are disposed. In the example shown in FIG. 2C, individual sheet 100c of the ordered stack of bound sheets may comprise a substrate 250 onto which a first printed product information sheet 200e and a second printed product information sheet 200f. For example, the substrate 250 may be an adhesive on which printed product information sheets 200 may be disposed. In another example, the substrate may be a liner and/or other backing for printed product information sheets 200e, 200f with an adhesive portion.

The first printed product information sheet 200e and the second printed product information sheet 200f may be disposed on the individual sheet 100c with respective borders disposed around the printed product information sheets 200e, 200f. In some examples, the printed product information sheets may be disposed on a substrate 100c without any surrounding border. In some embodiments, the printed product information sheets may share an edge. The edges shared by two printed product information sheets may be tearable. For example, the edges shared by the two printed product information sheets may be perforated, may be set out in thick lines to indicate a cutting line, and/or may otherwise be easily separable.

In some embodiments, the sizes of the first printed product information sheet 200e and the second printed product information sheet 200f may be the same. In some embodiments, the size of the first printed product information sheet 200e may be different from the size of the second printed product information sheet 200f. In some embodiments, the template and layout of the first printed product information sheet 200e and the second printed product information sheet 200f may be the same. In some embodiments, the template, layout, types of information printed, any combination thereof, and/or other information disposed on the first printed product information sheet 200e may be different from that disposed on the second printed product information sheet 200f.

The ordered stack of bound sheets 10 may be ordered based on the information printed on the printed product information sheets 200 of the stack 10. An individual printed product information sheet 200a may be associated with an individual product displayed in the store or a set of products that are displayed adjacent to each other in the store. An individual printed product information sheet 200 may be placed at a shelf, peg board, and/or other structure near the location of the product(s) associated with the individual printed product information sheet 200. In some embodiments, the printed product information sheets 200a, 200b, . . . , 200n may be placed on a shelf that includes a digital display, in a manner the same as or similar to the inclusion of shelf edge labels or strips in the display system as described in U.S. Pat. No. 7,287,001, filed Aug. 5, 2002, and incorporated herein in its entirety by reference. An individual printed product information sheet 200 may have printed thereon product information 210 related to the associated product(s), order indicator information 220, and/or other information related to a product in the store.

In some embodiments, an individual printed product information sheet 200 may comprise information printed thereon that is the same as or similar to a strip, as described in U.S. Pat. No. 8,626,613, filed Jan. 10, 2003, and incorporated herein in its entirety by reference.

The product(s) associated with an individual printed product information sheet 200, the order indicator 220 of the printed product information sheet 200, a size of a printed product information sheet 200, a template of the printed product information sheet 200, a layout of the information printed on the printed product information sheet 200, the types of information printed on the printed product information sheet 200, a potential connector attached to the printed product information sheet 200, and/or other information related to the printed product information sheet 200 may be obtained based on the planogram for the store.

For example, a first printed product information sheet 200a may have a length of 4 feet, may be die cut to fit into a connector at a first shelf, and may be placed as a shelf talker (i.e., printed material, or other mechanism positioned on or near a store shelf to call a buyer's attention to a particular product on the shelf) at the first shelf, while a second printed product information sheet 200b adjacent to the first printed product information sheet 200a in the ordered stack 10 may have a length of 2.5 inches and may have comprise a portion with adhesive backing to attach to a connector at a second shelf adjacent to the first shelf in the store. In this example, the first printed product information sheet 200a may be a shelf talker while the second printed product information sheet 200b may comprise information related to a promotion of a product on an adjacent shelf.

The ordered stack of bound sheets 10 may be ordered based on the order indicator information 220 printed on the individual printed product information sheets 200. Order indicator information 220 of an individual printed product information sheet 200 may comprise, for example, information related to an order of the printed product information sheet relative to the other printed product information sheets in the ordered stack of bound sheets.

In some embodiments, each bound sheet 100 may comprise a separate bound sheet order indicator printed thereon. In these embodiments, each individual bound sheet 100 may comprise a separate bound sheet order indicator regardless of the number of printed product information sheets 200 positioned on the individual bound sheet 100. In some examples, the bound sheet order indicator may be a number indicating a position of an individual bound sheet 100 relative to the other bound sheets in an ordered stack of bound sheets 10. In some examples, the bound sheet order indicator may comprise a starting location at which a first (or only) printed product information sheet positioned on the bound sheet is to be placed. The bound sheet order indicator may indicate the starting location based on planogram information for the store. In some embodiments, the bound sheet order indicator may comprise a starting location and an end location within which the plurality of (or single) printed product information sheets are to be placed in the store. The bound sheet order indicator may indicate the starting location and the end location based on planogram information for the store.

In some embodiments, the order indicator information 220 related to the order of the printed product information sheet 200 may comprise a number relating to a position of the printed product information sheet 200 in the set of printed information sheets 200a, 200b, ..., 200n included in the ordered stack of bound sheets 10, planogram information 230 for the product(s) associated with the printed product information sheet 200 from a planogram of products available in the store, a combination thereof, and/or other information related to the order of the printed product information sheet 200 relative to the other printed product information sheets 200a, 200b, ..., 200n in the ordered stack of bound sheets 10. In some embodiments, the planogram information 230 may be printed separately from the order indicator information 220 on a printed product information sheet.

The planogram information 230 may comprise information related to the location of the associated product(s) in the store, a location at which the printed product information sheet is to be placed in the store, a combination thereof, and/or other information related to the location in the store at which the printed product information sheet is to be placed. In some embodiments, the ordered stack of bound sheets may be ordered based on the planogram information of the printed product information sheets (e.g., based on a location at which the printed information sheets of the ordered stack are to be placed).

In some embodiments, the planogram information 230 may comprise textual information related to a specific placement of the printed product information sheet (e.g., with regard to aisle, shelf, location on shelf, and/or other location of an associated product), a graphic depiction of a location in the store (e.g., absolute location, location relative to a next ordered printed product information sheet, location on a shelf indicated by textual information, location relative to the associated product(s), location relative to an adjacent product, and/or other location) based on the planogram information for the printed product information sheet, a combination thereof, and/or other information related to the location at which the printed product information sheet is to be placed in the store. In some embodiments, the planogram information 230 also may comprise information related to placement location of an adjacent previous printed product information sheet and an adjacent next printed product information sheet in the ordered stack of bound sheets 10.

In some embodiments, the planogram information 230 also may comprise a graphical representation of a structure and product(s) associated with the printed product information sheet 200, a graphical representation of a structure at which the printed product information sheet 200 is to be positioned and adjacent product(s), a graphical representation of a structure at which the printed product information sheet 200 is to be positioned and the placement of other printed product information sheets 200 onto that structure, a graphical representation of a structure at which the printed product information sheet 200 is to be positioned, the placement of other printed product information sheets 200 onto that structure, one or more connectors and/or other attachment mechanisms on the structure at which no printed product information sheets 200 are to be placed, and/or other graphical representations of the position of the printed product information sheet 200 in the store.

In some embodiments, the order indicator 220 and/or the planogram information 230 may be printed on an opposite side of the printed product information sheet 200 from the product information 210. The position(s) of the product information 210, the order indicator 220, the planogram information 230, and/or any combination thereof on a printed product information sheet 200 is not limited to the examples described herein.

The product information 210 related to the product that is printed on the printed product information sheet 200 may comprise product price label information 210a, retailer-specific information 210b, product attribute information 210c, product category information (not shown), manufacturer-specific information (not shown), distributer-specific information (not shown), a combination thereof, and/or other information related to the product. Product price label information 210a may comprise, for example, mandatory information to be displayed for a product, such as product identifier, UPC code, price, weight per unit, and/or other information required by a state to be provided with a product displayed in a store. Retailer-specific information 210b may comprise, for example, information relating to a sale, coupon, and/or other promotion of a product, cross-sell information about a related product, and/or other retailer-specific information about the product. Product attribute information 210c may comprise, for example, a product logo, information related to branding of the product, and/or other information related to the product. Product category information may comprise, for example, information relating to a regulatory information to be provided with products in the product category associated with the product, product category indicator, and/or other information related to a product category of a product. Manufacturer-specific information may comprise, for example, regulatory information to be provided with the product, product manufacturer name, other indicia informing a viewer of the product origin or manufacture of the product, information related to other products from the manufacturer, and/or other information related to the manufacture and/or manufacturer of the product. Distributor-specific information may comprise, for example, distributor name, other indicia informing a viewer of the distributor of the product, related products from the distributor, and/or other information related to the distributor of the product.

In some embodiments, the individual printed product information sheet 200 may be placed at a shelf, peg board, and/or other structure near the location of the product associated with the individual printed product information sheet. In some embodiments, the structure itself may comprise a connector or the device into or onto which the individual printed product information sheet 200 may be positioned. For example, the individual printed product information sheet 200 may be die cut to fit into a holder at the structure. In some embodiments, the individual printed product information sheet 200 may comprise a connector via which the individual printed product information sheet 200 may be attached to the structure. The connector of the individual printed product information sheet 200 may comprise, for example, an adhesive connector, a clip, a button, and/or other fastener.

Figure 3A:
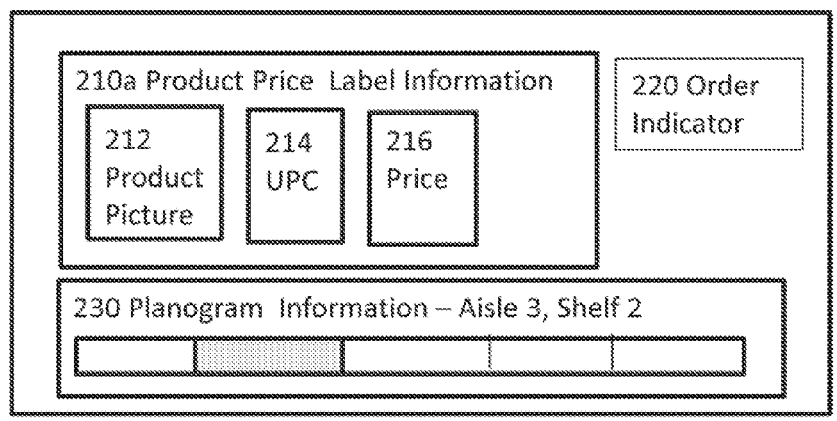
FIG. 3A illustrates exemplary printed product information sheet, according to an aspect of the invention.

As shown in FIG. 3A, an exemplary printed product information sheet 200a may have printed thereon product price label information 210a, including a product picture 212, product UPC symbol or QR code 214, product price 216, and/or other information desired or required by a governing authority to be displayed with a product displayed in a store for sale. The printed product information sheet 200a also may have printed thereon an order indicator 220 and planogram information 230. The planogram information 230 may comprise textual information, a graphic depiction, and/or other information related to a placement of the printed product information sheet 200a in the store.

Figure 3B:
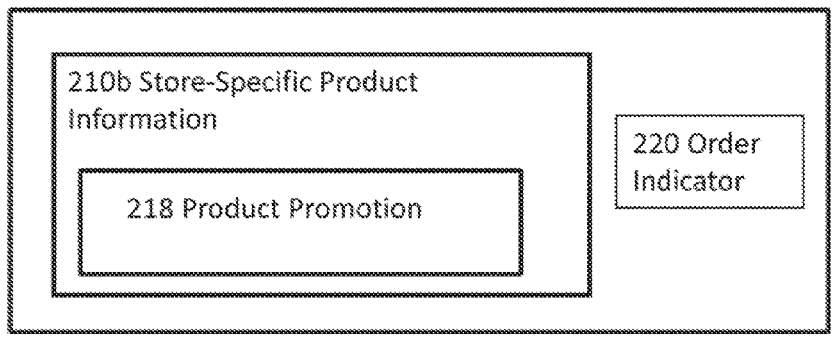
FIG. 3B illustrates an exemplary printed product information sheet, according to an aspect of the invention.

As shown in FIG. 3B, an exemplary printed product information sheet 200b may have printed thereon retailer-specific product information 210b, which may include a product promotion 218, and/or other retailer-specific product information. The printed product information sheet 200b may also comprise an order indicator 220, and/or other information printed thereon.

Figure 3C:
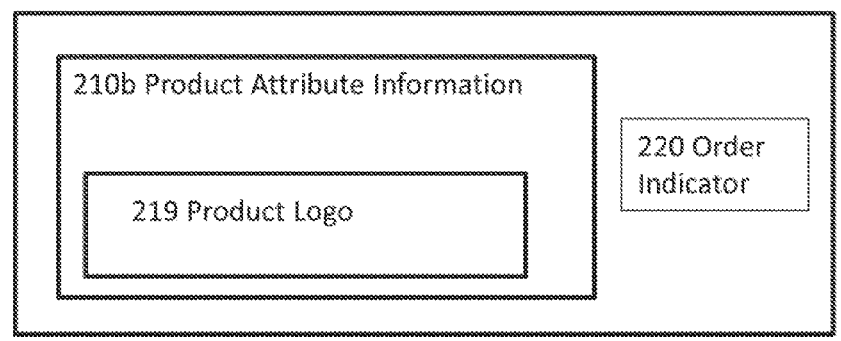
FIG. 3C illustrates an exemplary printed product information sheet, according to an aspect of the invention.

As shown in FIG. 3C, an exemplary printed product information sheet 200b may have printed thereon product attribute information 210c, which may include a product logo 219, and/or other retailer-specific product information. The printed product information sheet 200b may also comprise an order indicator 220, and/or other information printed thereon.

In some embodiments, a first printed product information sheet 200a and a second printed product information sheet 200b in a single ordered stack of bound sheets 10 may have different templates, may be of different sizes, may comprise different types of printed information, may comprise information printed in different orientations, colors, and/or with other different formats, may comprise different connectors for connection to a respective structure in the store, and/or may otherwise have different characteristics. In some embodiments, a first bound sheet 100a and a second bound sheet 100b may have different sizes, may comprise a different number of printed product information sheets disposed thereon, and/or may have other different characteristics.

In some embodiments, a set of printed product information sheets 200 may correspond to a subset of the products included in the planogram. For example, a set of printed product information sheets 200 may comprise replacement sheets for printed product information sheets 200 that are disposed throughout the store. In another example, printed product information sheets 200 may not be placed at every available position in the store.

In some embodiments, each of the printed product information sheets 200a, 200b, . . . , 200n of the set of printed product information sheets 200 may comprise planogram information that comprises a graphical representation of a structure at which the printed product information sheet 200 is to be positioned, the placement of other printed product information sheets 200 onto that structure, one or more connectors and/or other attachment mechanisms on the structure at which no printed product information sheets 200 are to be placed, and/or other graphical representations of the position of the printed product information sheet 200 in the store.

In other embodiments, the ordered stack of bound sheets 100 may comprise a set of printed product information sheets 200 for all of the products included in the planogram. In these embodiments, the set of printed product information sheets 200 may comprise a first subset of printed product information sheets 200 that correspond to the subset of products and a second subset of product information sheets that do not correspond to any products in the planogram. The second subset of product information sheets may be blank, may have printed thereon an indication that the individual product information sheet is not associated with a product in the planogram (e.g., an indication of "Empty", "No Label", "No Tag", and/or other indication), may have printed thereon only order indicator 220, planogram information 230, and/or may have printed thereon any combination thereof. The first subset of printed product information sheets and the second subset of product information sheets may be ordered in the ordered stack of bound sheets 100 based on the planogram for the store. For example, where a first product in the planogram is associated with a printed product information sheet 200a, a second product is not associated with any printed product information sheets, and a third product is associated with a second printed product information sheet 200b, the ordered stack 10 of bound sheets 100 may comprise a set of bound sheets 100 including the first printed product information sheet 200a, a blank product information sheet, and the second printed product information sheet 200b made available in order.

Figure 4:
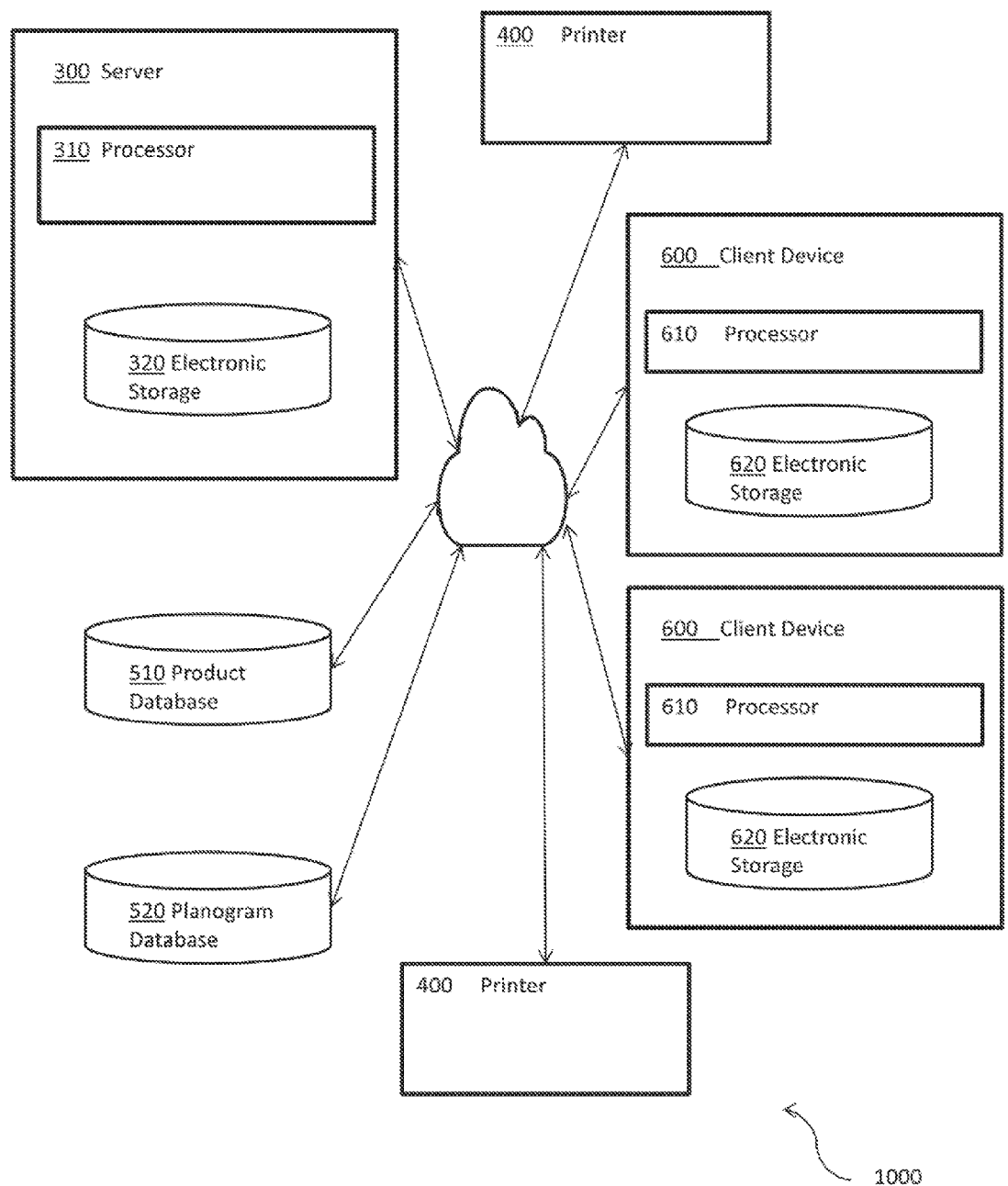
FIG. 4 illustrates a system for producing an ordered stack of bound sheets comprising a set of printed product information sheets, according to an aspect of the invention.

FIG. 4 illustrates a system for producing an ordered stack of bound sheets comprising a set of printed product information sheets, according to an aspect of the invention. The system 1000 may comprise a server 300 configured to receive planogram information related to a set of products at a store, and send information to be printed on a set of printed product information sheets to one or more printers 400. The server 300 may be communicably coupled to one or more databases, such as, for example, a product database 510 configured to store product information for a plurality of products, a planogram database 520 configured to store planogram information for one or more stores, and/or other databases. In some embodiments, system 1000 also may comprise one or more client devices 600 which may be associated with a store. A client device 600 may comprise, for example, one or more physical processors 610, a non-transitory electronic storage device 620, and/or other components. The server 300 may be configured to obtain planogram data and product data from non-transitory electronic storage device 320, from one or more of the product database 510, the planogram database 520, and/or other databases, from one or more client devices 600, and/or from other sources.

Figure 5:
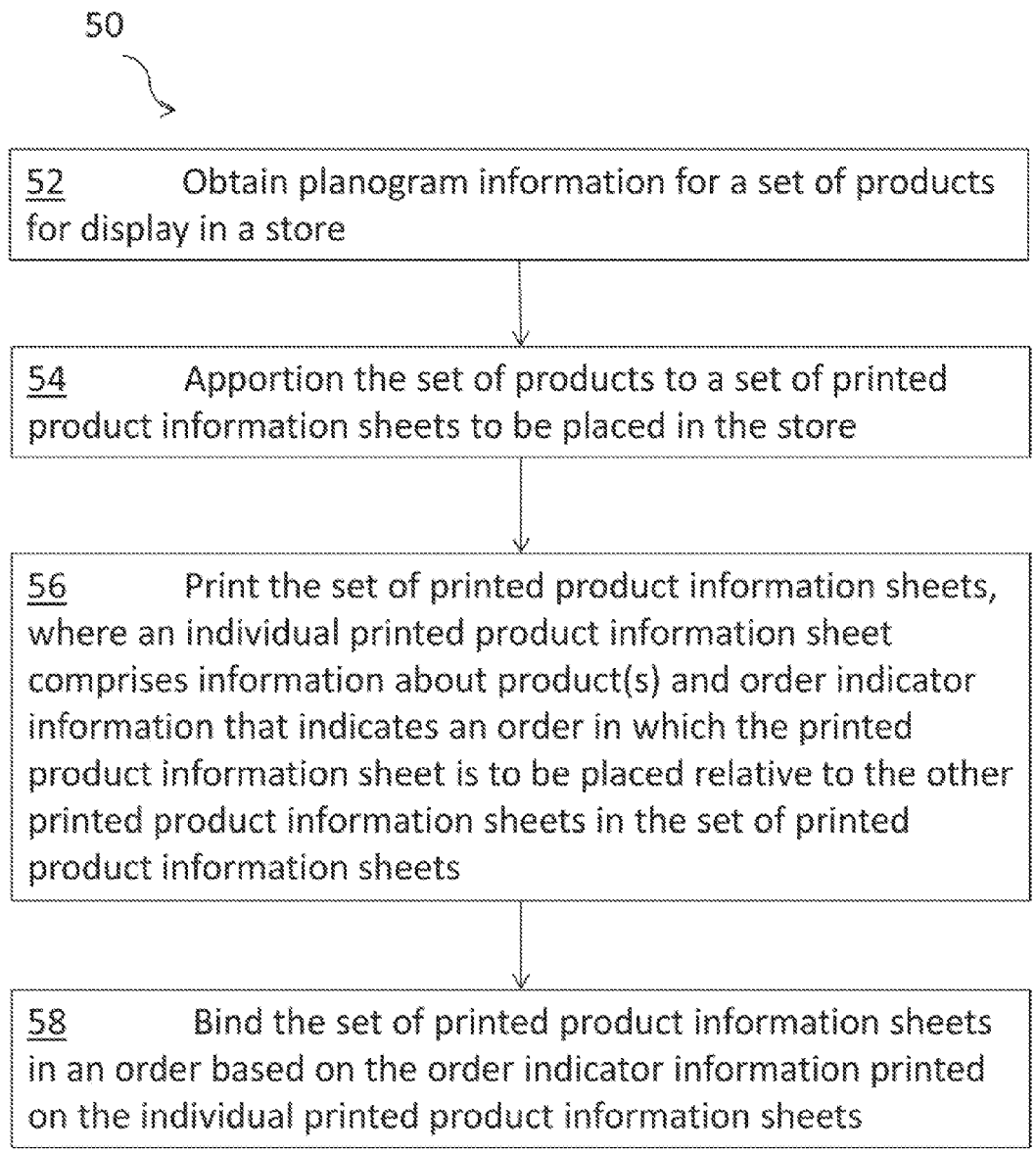
FIG. 5 illustrates a flow chart of an exemplary method of producing an ordered stack of bound sheets comprising a set of printed product information sheets, according to an aspect of the invention.

FIG. 5 illustrates a flow chart of an exemplary method of producing an ordered stack of bound sheets 10 comprising a set of printed product information sheets 200a, 200b, . . . , 200n, according to an aspect of the invention. In some embodiments, a computer-implemented method 50 for producing an ordered stack of bound sheets 10 comprising a set of printed product information sheets 200a, 200b, . . . , 200n may be implemented in computer system 1000 comprising a server 300 with one or more physical processors 310 and one or more printers 400 communicably coupled to the one or more physical processors 310.

The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 5 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

In the method 50, a bound sheet 100 may comprise a single printed product information sheet 200a or a set of printed product information sheets 200a, 200b, . . . , 200n. As shown in operation 52, the method for producing an ordered stack of bound sheets 10 comprising a set of printed product information sheets 200a, 200b, . . . , 200n may comprise, for example, obtaining, by the one or more physical processors 310, planogram data for a store, wherein the planogram data identifies a set of products for display in the store, and, for each individual product of the set of products, information related to a respective location in the store at which the individual product is displayed. Information related to a location at which a product is displayed may comprise, for example, an aisle number, a shelf and/or other structure number, a location on the shelf and/or other structure, an identification of an adjacent product, any combination thereof, and/or other location information related to the product.

As shown in an operation 54, product and planogram data related to the products may be apportioned among the set of printed product information sheets 200 based on the planogram data. The products may be apportioned among the set of printed product information sheets 200 in order of their location in the store, based on the planogram data for the store.

In an operation 56, the set of printed product information sheets 200a, 200b, . . . , 200n may be printed. For example, based on the planogram data and the structure at which a product is displayed, a set of printed product information sheets 200a, 200b, . . . , 200n may be printed by the one or more physical processors 310 and the one or more printers 400, such that the set of printed product information sheets 200a, 200b, . . . , 200n have printed thereon information about the set of products for display in the store. An individual printed product information sheet 200 may have printed thereon information about an individual product or a set of products, information about a location at which the printed product information sheet is to be placed in the store, an order indicator indicating an order of the printed product information sheet, and/or other information related to the product or set of products associated with the individual printed product information sheet.

In some embodiments, the information to be printed on an individual printed product information sheet 200 may be acquired, by the one or more physical processors 310, from one or more databases 500 communicably coupled to the one or more physical processors 310. The databases 500 may include, for example, a planogram database 510 comprising planogram data for the store, a product database 520 comprising product information for the set of products for display in the store, a non-transitory electronic storage device (e.g., non-transitory electronic storage device 320, non-transitory electronic storage device 620, and/or other non-transitory electronic storage device) configured to store a set of indicators for each individual product that indicate what information is to be printed for an individual product, and/or other information related to the set of products, and/or other databases related to the store. The databases also may include a regulatory database (not shown) that includes requirements for various jurisdictions regarding the type(s) of information to be disclosed with each product. Such a database or databases is disclosed in, for example, U.S. Patent Application Publication No. 2011/0066458, the disclosure of which is incorporated by reference herein in its entirety.

In an operation 58, the set of printed product information sheets 200a, 200b, . . . , 200b may be bound in an order based on the order indicator information printed on the individual printed product information sheets 200a, 200b, . . . , 200n. For example, the set of printed product information sheets 200 may be bound at a same edge (e.g., a top edge) with a glue binding, with a mechanical binding, with a removable adhesive binding, with a non-removable binding and a tearable strip, and/or by other types of binding.

In some embodiments, either between operations 56 and 58, or after operation 58, any necessary connectors may be attached to individual printed product information sheets 200. For example, an adhesive may be applied (with a lining and/or other backing) to a first printed product information sheet 200a while a clip may be applied to a second printed production information sheet 200b. In some examples, a same type of connector may be applied to all of the printed product information sheets 200a, 200b, . . . , 200n in an ordered stack of bound sheets 10.

In some embodiments, either before or after operation 56, the individual printed product information sheets 200 may be cut to a predetermined length. In some embodiments, a first printed product information sheet 200a may be cut to a first predetermined length and a second printed product information sheet 200b may be cut to a second predetermined length different from the first length. The predetermined length for an individual printed product information sheet 200 may be determined based on information stored at the system 1000 and/or may otherwise be determined.

In some embodiments, the printed product information sheets 200a, 200b, . . . , 200n may be printed in a manner the same as or similar to the printing of shelf edge labels or strips as described in U.S. Pat. No. 7,287,001, filed Aug. 5, 2002, and incorporated above in its entirety by reference, or in a manner the same as or similar to the printing of strips, as described in U.S. Pat. No. 8,626,613, filed Jan. 10, 2003, and incorporated above in its entirety by reference.

The printed product information sheet 200 may be placed adjacent to the product in the corresponding structure at which the product is displayed. In some embodiments, the planogram database 510, product database 520, regulations database, and/or other databases may comprise information related to how the printed product information sheet 200 is to be attached to a structure at which the associated product(s) are displayed. Based on the attachment information, the printed product information sheet 200 may be die cut to fit into a connector disposed at the structure, may have a connector affixed thereon, and/or may otherwise be made ready to connect to the structure at which the printed product information sheet 200 is to be placed. In some embodiments, this operation may be performed before or after the ordered stack of bound sheets 10 comprising the set of printed product information sheets 200a, 200b, . . . , 200n are bound.

In some embodiments in which a bound sheet 100 of the ordered stack of bound sheets 10 comprises an individual printed product information sheet 200, the printed product information sheets 200a, 200b, . . . , 200n may be bound together in an order based on the order indicator information printed on the set of printed product information sheets 200a, 200b, . . . , 200n.

In other embodiments in which a bound sheet 100 of the ordered stack of bound sheets 10 comprises a plurality of printed product information sheets 200a, 200b, the bound sheets 100 may be bound together in an order based on the order indicator information printed on the plurality of printed product information sheets 200a, 200b, . . . , 200n.

In other embodiments in which a bound sheet 100 comprises a substrate on which one or more printed product information sheets 200 may be positioned, the set of printed product information sheets 200a, 200b, . . . , 200n may be apportioned in order to one or more substrates, based on a number of printed product information sheets 200a, 200b, . . . , 200n that may be positioned on an individual substrate. The substrates may be bound before or after the printed product information sheets 200a, 200b, . . . , 200n are positioned thereon.

Figure 6:
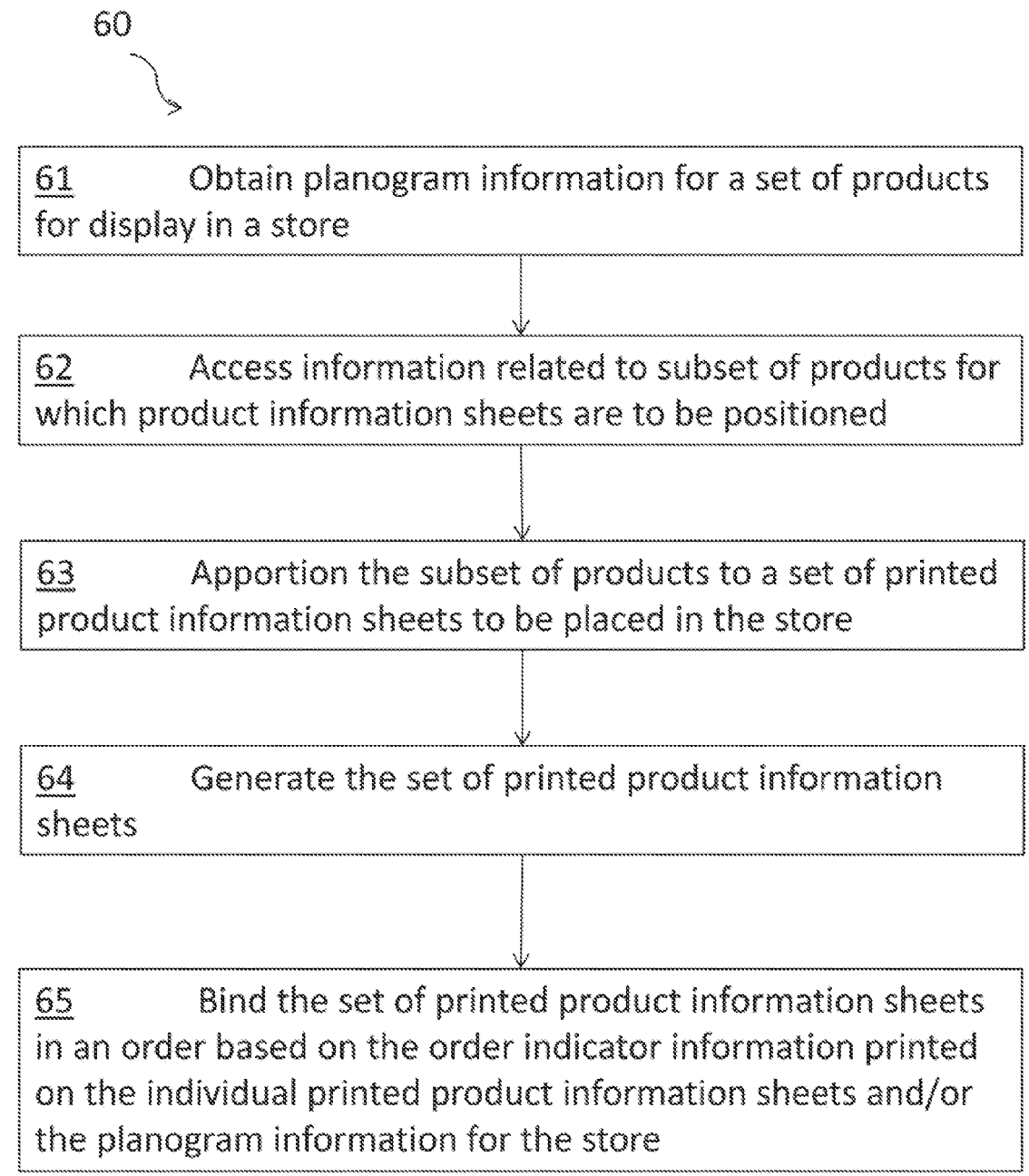
FIG. 6 illustrates a flow chart of an exemplary method of producing an ordered stack of bound sheets comprising a set of printed product information sheets, according to an aspect of the invention.

FIG. 6 illustrates a flow chart of an exemplary method of producing an ordered stack of bound sheets 10 comprising a set of printed product information sheets 200a, 200b, . . . , 200n for a subset of the products in the planogram for the store, according to an aspect of the invention.

In some embodiments, a computer-implemented method 50 for producing an ordered stack of bound sheets 10 comprising a set of printed product information sheets 200a, 200b, . . . , 200n may be implemented in computer system 1000 comprising a server 300 with one or more physical processors 310 and one or more printers 400 communicably coupled to the one or more physical processors 310.

In the method 60, a bound sheet 100 may comprise a single printed product information sheet 200a or a set of printed product information sheets 200a, 200b, . . . , 200n. As shown in operation 61, the method for producing an ordered stack of bound sheets 10 comprising a set of printed product information sheets 200a, 200b, . . . , 200n for a subset of the products in the planogram for the store may comprise, for example, obtaining, by the one or more physical processors 310, planogram data for a store, wherein the planogram data identifies a set of products for display in the store, and, for each individual product of the set of products, information related to a respective location in the store at which the individual product is displayed. Information related to a location at which a product is displayed may comprise, for example, an aisle number, a shelf and/or other structure number, a location on the shelf and/or other structure, an identification of an adjacent product, any combination thereof, and/or other location information related to the product.

As shown in an operation 62, information may be obtained related to a subset of the products from the planogram for which product information sheets are to be positioned in the store. The information related to the subset of products may be obtained from one or more databases (e.g., planogram database 510, product database 520, and/or other database), non-transitory electronic storage device 310 of the server, one or more client devices 600, and/or from other sources.

As shown in an operation 63, product and planogram data related to the products may be apportioned among the set of printed product information sheets 200 based on the planogram data. The products may be apportioned among the set of printed product information sheets 200 in order of their location in the store, based on the planogram data for the store.

In some embodiments, individual blank sheets of a set of blank sheets may be included in the set of printed product information sheets 200a, 200b, . . . , 200n. For example, for a product in the planogram that was not included in the subset of products, a blank sheet may be inserted at a corresponding position in the set of printed product information sheets 200a, 200b, . . . , 200n. As such, the set of printed product information sheets 200 may comprise printed product information sheets as well as individual blank sheets. Each individual blank sheet of the set of blank sheets may correspond to a distinct product included in the planogram that was not included in the subset of products. In another example, each individual blank sheet of the set of blank sheets may correspond to an attachment structure positioned at a structure in the store and included in the planogram for which a printed product information sheet 200a was not included.

In an operation 63, the set of printed product information sheets 200a, 200b, . . . , 200n may be generated. For example, based on the planogram data and the structure at which a product is displayed, a set of printed product information sheets 200a, 200b, . . . , 200n may be printed by the one or more physical processors 310 and the one or more printers 400, such that the set of printed product information sheets 200a, 200b, . . . , 200n have printed thereon information about the subset of products. An individual printed product information sheet 200 may have printed thereon information about an individual product or a set of products, information about a location at which the printed product information sheet is to be placed in the store, an order indicator indicating an order of the printed product information sheet, planogram information, and/or other information related to the product or set of products associated with the individual printed product information sheet.

In some embodiments, the information to be printed on an individual printed product information sheet 200 may be acquired, by the one or more physical processors 310, from one or more databases 500 communicably coupled to the one or more physical processors 310. The databases 500 may include, for example, a planogram database 510 comprising planogram data for the store, a product database 520 comprising product information for the set of products for display in the store, a non-transitory electronic storage device (e.g., non-transitory electronic storage device 320, non-transitory electronic storage device 620, and/or other non-transitory electronic storage device) configured to store a set of indicators for each individual product that indicate what information is to be printed for an individual product, and/or other information related to the set of products, and/or other databases related to the store. The databases also may include a regulatory database (not shown) that includes requirements for various jurisdictions regarding the type(s) of information to be disclosed with each product. Such a database or databases is disclosed in, for example, U.S. Patent Application Publication No. 2011/0066458, the disclosure of which is incorporated by reference herein in its entirety.

In some embodiments in which the individual printed product information sheets 200 comprise planogram information indicating a location, structure, structure portion, and/or other position in the store at which the individual printed product information sheet is to be placed, printed product information sheets are only generated for the subset of products.

In some embodiments, the printed product information sheets 200 may be generated for the remaining products in the planogram (e.g., the products included in the planogram but not included in the subset of products). In some embodiments, the generated printed product information sheets for the remaining products may have printed thereon order indicator information 220, planogram information 230, an indication that the printed product information sheet is not associated with any products, and/or any combination thereof. In some embodiments, the generated printed product information sheets may not be manipulated in any manner (e.g., may be blank sheets that may not have any information printed thereon).

In an operation 68, the set of printed product information sheets 200a, 200b, . . . , 200b may be bound in an order based on the order indicator information printed on the individual printed product information sheets 200a, 200b, . . . , 200n, based on the planogram information, and/or any combination thereof. For example, the set of printed product information sheets 200 may be bound at a same edge (e.g., a top edge) with a glue binding, with a mechanical binding, with a removable adhesive binding, with a non-removable binding and a tearable strip, and/or by other types of binding.

In some embodiments in which the set of ordered printed product information sheets 200 includes the printed product information sheets 200a, 200b, 200n and the individual blank sheets, the set of printed product information sheets 200 may be bound in an order based on order indicator information printed on the individual printed product information sheets 200a, 200b, . . . , 200n and based on the planogram information.

In some embodiments, either between operations 64 and 65, or after operation 65, any necessary connectors may be attached to individual printed product information sheets 200. For example, an adhesive may be applied (with a lining and/or other backing) to a first printed product information sheet 200a while a clip may be applied to a second production information sheet 200b. In some examples, a same type of connector may be applied to all of the printed product information sheets 200 in an ordered stack of bound sheets 10.

In some embodiments, either before or after operation 64, the individual printed product information sheets 200 may be cut to a predetermined length. In some embodiments, a first printed product information sheet 200a may be cut to a first predetermined length and a second printed product information sheet 200b may be cut to a second predetermined length different from the first length. The predetermined length for an individual printed product information sheet 200 may be determined based on information stored at the system 1000 and/or may otherwise be determined.

In some embodiments, the printed product information sheets 200a, 200b, . . . , 200n may be printed in a manner the same as or similar to the printing of shelf edge labels or strips as described in U.S. Pat. No. 7,287,001, filed Aug. 5, 2002, and incorporated above in its entirety by reference, or in a manner the same as or similar to the printing of strips, as described in U.S. Pat. No. 8,626,613, filed Jan. 10, 2003, and incorporated above in its entirety by reference.

The printed product information sheet 200 may be placed adjacent to the product in the corresponding structure at which the product is displayed. In some embodiments, the planogram database 510, product database 520, regulations database, and/or other databases may comprise information related to how the printed product information sheet 200 is to be attached to a structure at which the associated product(s) are displayed. Based on the attachment information, the printed product information sheet 200 may be die cut to fit into a connector disposed at the structure, may have a connector affixed thereon, and/or may otherwise be made ready to connect to the structure at which the printed product information sheet 200 is to be placed. In some embodiments, this operation may be performed before or after the ordered stack of bound sheets 10 comprising the set of printed product information sheets 200 are bound.

In some embodiments in which a bound sheet 100 of the ordered stack of bound sheets 10 comprises an individual printed product information sheet 200, the printed product information sheets 200a, 200b, . . . , 200n may be bound together in an order based on the order indicator information printed on the set of printed product information sheets 200a, 200b, . . . , 200n.

In other embodiments in which a bound sheet 100 of the ordered stack of bound sheets 10 comprises a plurality of printed product information sheets 200a, 200b, the bound sheets 100 may be bound together in an order based on the order indicator information printed on the plurality of printed product information sheets 200a, 200b, . . . , 200n.

In other embodiments in which a bound sheet 100 comprises a substrate on which one or more printed product information sheets 200 may be positioned, the set of printed product information sheets 200a, 200b, . . . , 200n may be apportioned in order to one or more substrates, based on a number of printed product information sheets 200a, 200b, . . . , 200n that may be positioned on an individual substrate. The substrates may be bound before or after the printed product information sheets 200a, 200b, . . . , 200n are positioned thereon.

Figure 7:
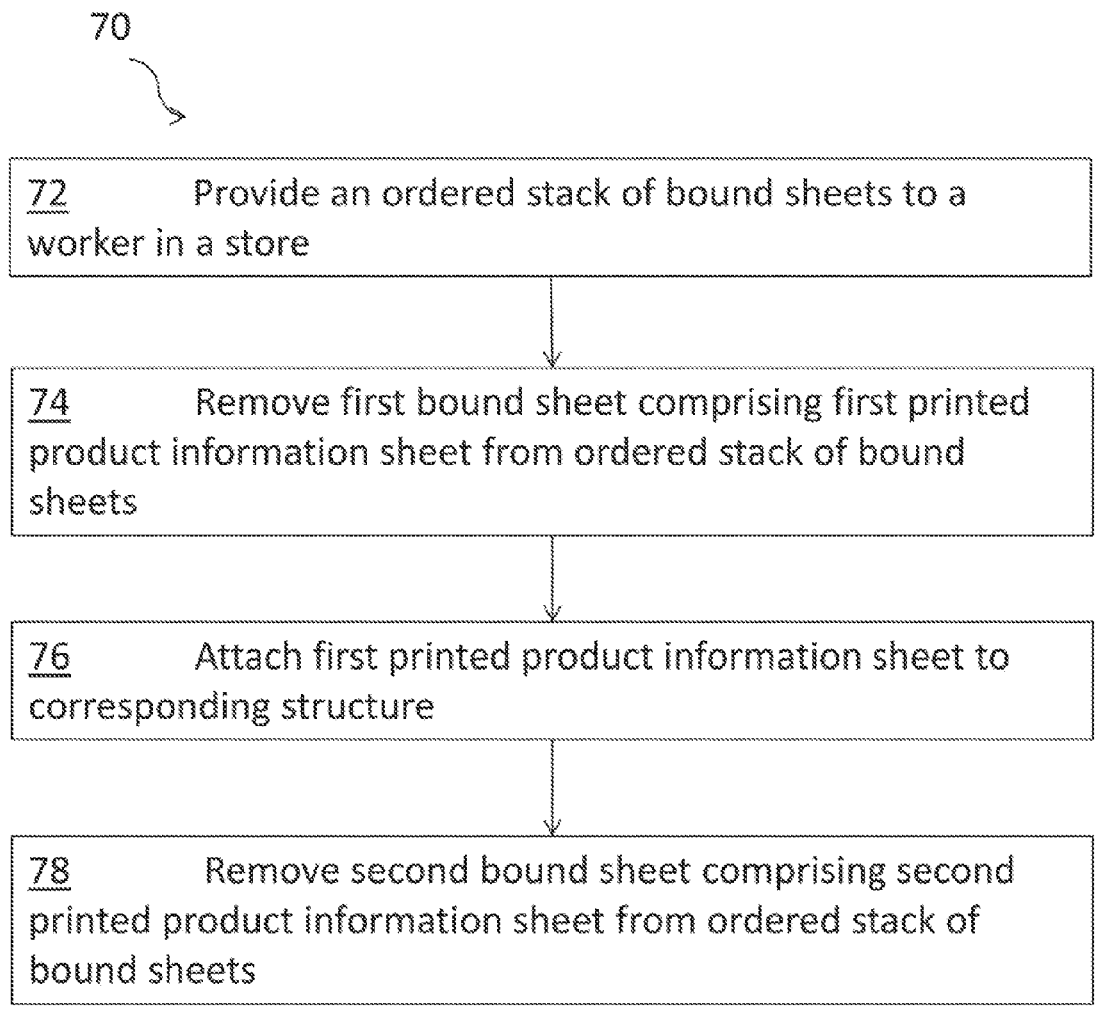
FIG. 7 illustrates a flow chart of an exemplary method followed by a store worker to place the printed product information sheets in the store, according to an aspect of the invention.

FIG. 7 illustrates a flow chart of an exemplary method followed by a store (e.g., by employee, machine, apparatus, and/or other entity) to place the printed product information sheets in the store, according to an aspect of the invention. In the exemplary method of FIG. 7, at least the first bound sheet and the second bound sheet of the ordered stack of sheets comprise a respective single printed product information sheet.

In an operation 72, the store may receive the ordered stack of bound sheets 10. In an operation 74, the store may remove the first bound sheet comprising the first printed product information sheet from the ordered stack of bound sheets. In an operation 76, the store may attach the first printed product information sheet to a corresponding structure based on the planogram information for the store. In an operation 78, the store may remove the second bound sheet comprising a second printed product information sheet from the ordered stack of bound sheets.

Figure 8:
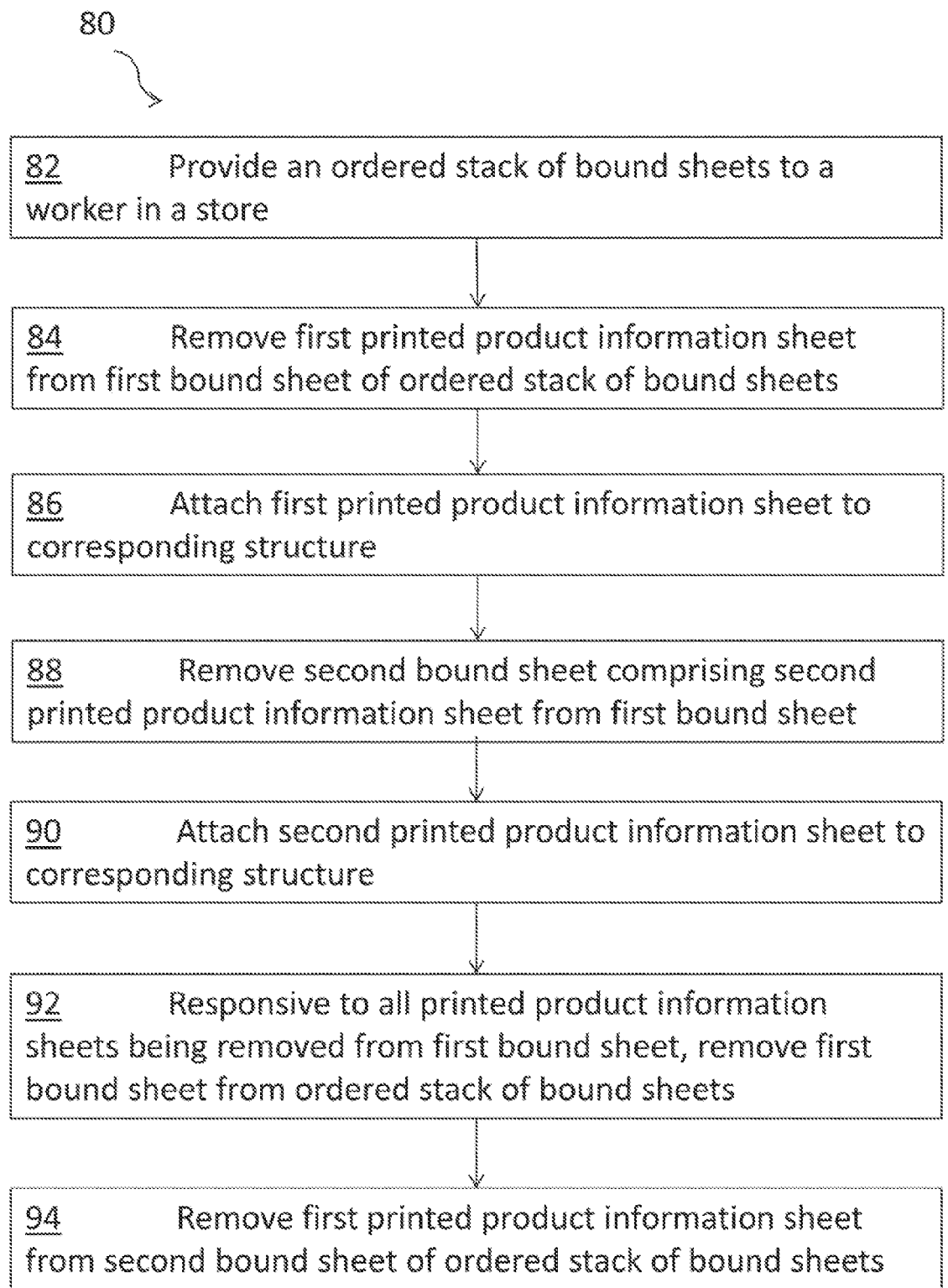
FIG. 8 illustrates a flow chart of an exemplary method followed by a store worker to place the printed product information sheets in the store, according to an aspect of the invention.

FIG. 8 illustrates a flow chart of an exemplary method followed by a store (e.g., by employee, machine, apparatus, and/or other entity) to place the printed product information sheets in the store, according to an aspect of the invention. In the exemplary method of FIG. 8, at least the first bound sheet comprises a set of printed product information sheets.

In an operation 82, the store may receive the ordered stack of bound sheets 10. In an operation 84, the store may remove a first printed product information sheet from a first bound sheet of the ordered stack of bound sheets. In an operation 86, the store may attach the first printed product information sheet to a first corresponding structure based on the planogram information for the store. In an operation 88, the store may remove a second printed product information sheet from the first bound sheet of the ordered stack of bound sheets.

In an operation 90, the store may attach the second printed product information sheet to a second corresponding structure based on the planogram information for the store, where the second corresponding structure may be adjacent to the first corresponding structure in the planogram information for the store.

In an operation 92, responsive to a determination that all of the printed product information sheets have been removed from the first bound sheet, the store may remove the first bound sheet from the ordered stack of bound sheets. In an operation 94, the store may remove a first printed product information sheet from a second bound sheet of the ordered stack of bound sheets.

The server 300 may be any computing device such as, for example, a server, a desktop computer, laptop computer, personal digital assistant, smart phone, and/or any other computing device. Other configurations and system architectures may be used. For example, although not shown, server 300 may be or include one or more servers connected to one or more clients via a network 20 such as a Wide Area Network, Local Area Network, the Internet, a cloud-based network and/or other network or combination thereof. The server 300 may be capable of communicating with network 20, non-transitory electronic storage device 320, databases 500, and/or other computing devices. The server 300 may include a plurality of hardware, software, and/or firmware components operating together to provide the functionality attributed herein to server 300. For example, server 300 may be implemented by a cloud of computing platforms operating together as server 300.

Processor(s) 310 may be configured to provide information processing capabilities in computing device 300. As such, processor 310 may include one or more of a digital processor, an analog processor, a digital circuit designed to process information, an analog circuit designed to process information, a state machine, and/or other mechanisms for electronically processing information. Although processor 310 is shown in FIG. 4 as a single entity, this is for illustrative purposes only. In some embodiments, processor 310 may include a plurality of processing units. These processing units may be physically located within the same device, or processor 310 may represent processing functionality of a plurality of devices operating in coordination. The processor 310 may be configured to execute functionality by software; hardware; firmware; some combination of software, hardware, and/or firmware; and/or other mechanisms for configuring processing capabilities on processor 310.

The non-transitory electronic storage device 320 may be at least one database that stores system data such as information related to the plurality of products, planogram information, information related to the ordered stack of bound sheets, information related to activity performed via the system 1000, and/or any other data. The non-transitory electronic storage device 320 may be associated and communicate with the server 300.

The one or more databases comprising the non-transitory electronic storage device 320 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some embodiments, the non-transitory electronic storage device 320 may be part of or hosted by a computing device on the network 20. In some embodiments, the non-transitory electronic storage device 320 may be part of or hosted by the server 300. In some embodiments, the non-transitory electronic storage device 320 may be physically separate from the server 300 but may be operably communicable therewith.

In some embodiments, the non-transitory electronic storage device 320 may comprise electronic storage media that electronically stores information. The non-transitory electronic storage device 320 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 320 may include one or more virtual storage resources (e.g., cloud storage, a virtual private network, and/or other virtual storage resources). The non-transitory electronic storage device 320 may store software algorithms, information determined by processor 310, information received from server 300, information received from client devices 600, information received from third parties, and/or other information that enables server 300 to function as described herein.

A client device 600 may facilitate communication with the server 300. For example, a user may communicate with the server 300 via a client device 600. In some embodiments, the term user may be interchangeably used herein with the term client device. In some embodiments, a user's actions and/or functionality as described herein may be carried out and/or implemented by a client device 600. A client device 600 may include one or more processors 610 that are configured to execute computer program components. The computer program components may be configured to enable an expert or user associated with the client device 600 to interface with system 1000 and/or other components of the system 1000, and/or provide other functionality attributed herein to client device 600. By way of non-limiting example, the client device 600 may include one or more of a desktop computer, a laptop computer, a handheld computer, a tablet computing platform, a NetBook, a Smartphone, a gaming console, and/or other computing platforms. The client device 600 may be capable of communicating with network 20, server 300, non-transitory electronic storage device 320, databases 500, and/or other computing devices.

Processor(s) 610 may be configured to provide information processing capabilities in client device 600. As such, processor 610 may include one or more of a digital processor, an analog processor, a digital circuit designed to process information, an analog circuit designed to process information, a state machine, and/or other mechanisms for electronically processing information. Although processor 610 is shown in FIG. 4 as a single entity, this is for illustrative purposes only. In some embodiments, processor 610 may include a plurality of processing units. These processing units may be physically located within the same device, or processor 610 may represent processing functionality of a plurality of devices operating in coordination. The processor 610 may be configured to execute functionality by software; hardware; firmware; some combination of software, hardware, and/or firmware; and/or other mechanisms for configuring processing capabilities on processor 610.

The non-transitory electronic storage device 620 may be at least one database that stores system data such as information related to the plurality of products, planogram information, information related to the ordered stack of bound sheets, information related to activity performed via the system 1000, and/or any other data. The non-transitory electronic storage device 620 may be associated and communicate with the client device 600.

The one or more databases comprising the non-transitory electronic storage device 620 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The database may comprise one or more such databases that reside in one or more physical devices and in one or more physical locations. The database may store a plurality of types of data and/or files and associated data or file descriptions, administrative information, or any other data.

In some embodiments, the non-transitory electronic storage device 620 may be part of or hosted by a computing device on the network 20. In some embodiments, the non-transitory electronic storage device 620 may be part of or hosted by the client device 600. In some embodiments, the non-transitory electronic storage device 620 may be physically separate from the client device 600 but may be operably communicable therewith.

In some embodiments, the non-transitory electronic storage device 620 may comprise electronic storage media that electronically stores information. The non-transitory electronic storage device 620 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 620 may include one or more virtual storage resources (e.g., cloud storage, a virtual private network, and/or other virtual storage resources). The non-transitory electronic storage device 620 may store software algorithms, information determined by processor 610, information received from server 300, information received from other client devices 600, information received from third parties, and/or other information that enables client device 600 to function as described herein.

The printers 400 may be any known printers that are able to receive data from the server 300, over a wired or wireless network or by wired connection to the server 400. The printers 400 may be any known printers capable of, configured to, or configurable to print the printed product information sheets in the manner described herein.

The databases 500 may be at least one database that stores system data such as information related to the plurality of products, planogram information, information related to the ordered stack of bound sheets, information related to activity performed via the system 1000, information regarding regulations of various jurisdictions that govern the type(s) of information required for a given product or product type, and/or any other data. The non-transitory electronic storage device 320 may be associated and communicate with the server 300.

The one or more databases 500 may be, include, or interface to, for example, an Oracle™ relational database sold commercially by Oracle Corporation. Other databases, such as Informix™, DB2 (Database 2) or other data storage, including file-based, object, or query formats, platforms, or resources such as OLAP (On Line Analytical Processing), SQL (Standard Query Language), NoSQL, a SAN (storage area network), Microsoft Access™ or other form of database may also be used, incorporated, or accessed. The databases 500 may comprise one or more such databases that reside in one or more physical devices and in one or more physical locations. The database may store a plurality of types of data and/or files and associated data or file descriptions, administrative information, or any other data.

In some embodiments, the databases 500 may be part of or hosted by a computing device on the network 20. In some embodiments, the databases 500 may be part of or hosted by the server 300. In some embodiments, the databases 500 may be physically separate from the server 300 but may be operably communicable therewith.

In some embodiments, the databases 500 may comprise electronic storage media that electronically stores information. The databases 500 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The non-transitory electronic storage device 320 may include one or more virtual storage resources (e.g., cloud storage, a virtual private network, and/or other virtual storage resources). The non-transitory electronic storage device 320 may store software algorithms, information determined by processor 310, information received from server 300, information received from client devices 600, information received from third parties, and/or other information that enables server 300 to function as described herein.

In addition, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Embodiments and implementations described herein as including a particular feature, structure, or characteristic, but every aspect or implementation may not necessarily include the particular feature, structure, or characteristic. Further, when a particular feature, structure, or characteristic is described in connection with an embodiment or implementation, it will be understood that such feature, structure, or characteristic may be included in connection with other embodiments or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method of producing an ordered stack of at least first and second bound sheets comprising a set of printed product information sheets to be placed in a store, the method being implemented in a computer system comprising one or more physical processors and one or more printers, the method comprising:

accessing, by the one or more physical processors, planogram information for a set of products for display in a store, wherein the planogram information comprises information identifying the set of products for display and information identifying a corresponding set of locations in the store at which the respective set of products are to be displayed;

apportioning, by the one or more physical processors, the set of products to a set of product information sheets, wherein a first product information sheet is associated with at least a first product and a second product information sheet is associated with at least a second product;

apportioning, by the one or more physical processors, the set of product information sheets to the set of bound sheets, wherein a first bound sheet comprises the first product information sheet and the second product information sheet and a second bound sheet comprises a third product information sheet;

printing, by the one or more printers, first information on a first product information sheet, the first information comprising at least first product information about a first product to be displayed in the store and a first order indicator indicating a first order of the first product information sheet based on a planogram of the store, thereby producing a first printed product information sheet; and printing, by the one or more printers, second information on a second product information sheet, the second information comprising at least second product information about a second product to be displayed in the store and a second order indicator indicating a second order of the second product information sheet based on the planogram of the store, thereby producing a second printed product information sheet, printing, by the one or more printers, third information on a third product information sheet, the second information comprising at least third product information about a third product to be displayed in the store and a third order indicator indicating a third order of the third product information sheet based on the planogram of the store, thereby producing a third printed product information sheet, ordering the first bound sheet and the second bound sheet according to the first order indicator printed on the first printed product information sheet, the second order indicator printed on the second printed product information sheet, and the third order indicator printed on the third printed product information sheet, thereby producing ordered first and second bound sheets, and binding the ordered first and second bound sheets to produce the ordered stack of at least the first and second bound sheets.

2. The method of claim 1, wherein binding the ordered first and second bound sheets comprises:

binding the first bound sheet by adhesive to the second bound sheet, wherein the second bound sheet is adjacent to the first bound sheet in the ordered stack.

3. The method of claim 1, wherein binding the ordered first and second bound sheets comprises:

binding the first bound sheet by a glue binding at an edge of the first bound sheet to the other bound sheets of the ordered stack.

4. The method of claim 1, wherein ordering the first bound sheet and the second bound sheet comprises:

ordering the first bound sheet and the second bound sheet based on a first location at which the first bound sheet is to be placed according to the planogram of the store and a second location at which the second bound sheet is to be placed according to the planogram.

5. The method of claim 4, wherein the first bound sheet is adjacent to the bound sheet in the ordered stack, and wherein the third location is immediately adjacent the second location in the planogram of the store.

6. The method of claim 1, further comprising:

generating between the first printed production information sheet and the second printed product information sheet on the first bound sheet, a tearable edge by which the first printed production information sheet and the second printed product information sheet may be easily separated.

7. The method of claim 1, wherein printing first product information on the first product information sheet comprises printing first product price label information, wherein the first product price label information comprises a description of the first product and a price of the first product.

8. The method of claim 1, wherein printing first product information on the first product information sheet comprises printing first retailer-specific information, wherein the first retailer-specific information comprises one or more of: a promotion related to the first product or cross-sell information related to the first product.

9. The method of claim 1, wherein printing the first information on the first product information sheet comprises printing first planogram information, the first planogram information comprising one or more of: textual information describing a first location at which the first printed product information sheet is to be placed in the store or a graphic depiction of the first location.

10. The method of claim 1, wherein printing the first information on the first product information sheet comprises printing fourth product information about a fourth product to be displayed in the store.

\* \* \* \* \*